United States Patent
Cheng et al.

(10) Patent No.: US 10,120,487 B2
(45) Date of Patent: Nov. 6, 2018

(54) METHOD AND DEVICE FOR HYBRID TOUCH SENSING

(71) Applicant: NOVATEK MICROELECTRONICS CORP., HsinChu (TW)

(72) Inventors: Chih-Jen Cheng, Hsinchu (TW);
He-Wei Huang, Hsinchu (TW);
Tsen-Wei Chang, Taichung (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 25 days.

(21) Appl. No.: 15/194,676

(22) Filed: Jun. 28, 2016

(65) Prior Publication Data
US 2017/0371475 A1 Dec. 28, 2017

(51) Int. Cl.
*G06F 3/044* (2006.01)
*G06F 3/041* (2006.01)

(52) U.S. Cl.
CPC .......... *G06F 3/0416* (2013.01); *G06F 3/044* (2013.01); *G06F 3/0414* (2013.01); *G06F 2203/04106* (2013.01)

(58) Field of Classification Search
CPC .................................. G06F 3/041; G06F 3/044
See application file for complete search history.

(56) References Cited

U.S. PATENT DOCUMENTS

| | | | | |
|---|---|---|---|---|
| 8,988,384 B2* | 3/2015 | Krah | .................... | G06F 3/0414 178/18.05 |
| 2005/0099188 A1* | 5/2005 | Baxter | .................... | G01D 5/24 324/678 |
| 2008/0062148 A1* | 3/2008 | Hotelling | ............ | G02F 1/13338 345/174 |
| 2008/0069413 A1* | 3/2008 | Riedijk | ................ | G06K 9/0002 382/124 |
| 2010/0085322 A1* | 4/2010 | Mamba | .................... | G06F 3/044 345/173 |
| 2013/0069905 A1* | 3/2013 | Krah | .................... | G06F 3/0418 345/174 |
| 2013/0076646 A1* | 3/2013 | Krah | .................... | G06F 3/0414 345/173 |

* cited by examiner

*Primary Examiner* — Olga Merkoulova
(74) *Attorney, Agent, or Firm* — McClure, Qualey & Rodack, LLP

(57) ABSTRACT

A method for hybrid touch sensing for detecting a normal touch and a force touch concurrently is provided. The method includes the following steps. Provide a first driving signal to a first capacitor, wherein the first driving signal is a periodic signal with a first frequency. Provide a second driving signal to a second capacitor, wherein the second driving signal is a periodic signal with a second frequency different from the first frequency. Generate a composite sensing signal by feeding the first driving signal and the second driving signal to a front-end circuit. Extract information from the composite sensing signal to calculate a first change in capacitance of the first capacitor and a second change in capacitance of the second capacitor to detect the normal touch and the force touch concurrently.

20 Claims, 7 Drawing Sheets

METHOD AND DEVICE FOR HYBRID TOUCH SENSING

TECHNICAL FIELD

The disclosure relates in general to a method and a device for hybrid touch sensing, and more particularly to a method and a device for detecting a normal touch and a force touch concurrently.

BACKGROUND

Several different input mechanisms for performing operations on an electronic device are available today. In particular, touch devices, such as touch screens, are becoming increasingly popular in portable electronic devices because of their ease and versatility of operation. Touch devices allow a user to make selections or move objects on the screen by simply moving their finger or a stylus on a touch panel.

Among several types of technologies for implementing a touch device, capacitive touch sensing devices work particularly well in portable electronic devices. In a capacitive touch device, as an object such as a finger approaches the touch panel, a tiny capacitance can form between the object and the sensing points in close proximity to the object. By detecting changes in capacitance, the sensing circuit can recognize the object and determine the location of the object on the touch panel.

In addition to detecting the location of the object, the pressure of the object may also be detected in order to provide more functionality to the touch device. For example, different force applied on the same sensing point may correspond to different actions performed by the touch device. Therefore, it is an important subject in the industry to design a method for hybrid touch sensing, for detecting a normal touch (corresponding to the position coordinate of the object on the touch panel) and a force touch (corresponding to the vertical pressure applied to the touch panel).

SUMMARY

The disclosure is directed to a method and a device for hybrid touch sensing, such that the normal touch and the force touch can be detected concurrently, and the hardware cost can be reduced.

According to one embodiment of the invention, a method for hybrid touch sensing for detecting a normal touch and a force touch is provided. The method includes the following steps. Provide a first driving signal to a first capacitor, wherein the first driving signal is a periodic signal with a first frequency. Provide a second driving signal to a second capacitor, wherein the second driving signal is a periodic signal with a second frequency different from the first frequency. Generate a composite sensing signal by feeding the first driving signal and the second driving signal to a front-end circuit. Extract information from the composite sensing signal to calculate a first change in capacitance of the first capacitor and a second change in capacitance of the second capacitor to detect the normal touch and the force touch concurrently.

According to one embodiment of the invention, a device for hybrid touch sensing for detecting a normal touch and a force touch is provided. The device includes a first capacitor for sensing the normal touch, a second capacitor for sensing the force touch, a first driving source, a second driving source, a front-end circuit, and a processing circuit. The first driving source provides a first driving signal to the first capacitor, wherein the first driving signal is a periodic signal with a first frequency. The second driving source provides a second driving signal to the second capacitor, wherein the second driving signal is a periodic signal with a second frequency different from the first frequency. The front-end circuit is configured to generate a composite sensing signal in response to the first driving signal and the second driving signal. The processing circuit is configured to extract information from the composite sensing signal to calculate a first change in capacitance of the first capacitor and a second change in capacitance of the second capacitor to detect the normal touch and the force touch concurrently.

The invention will become apparent from the following detailed description of the preferred but non-limiting embodiments. The following description is made with reference to the accompanying drawings.

Figure 1:
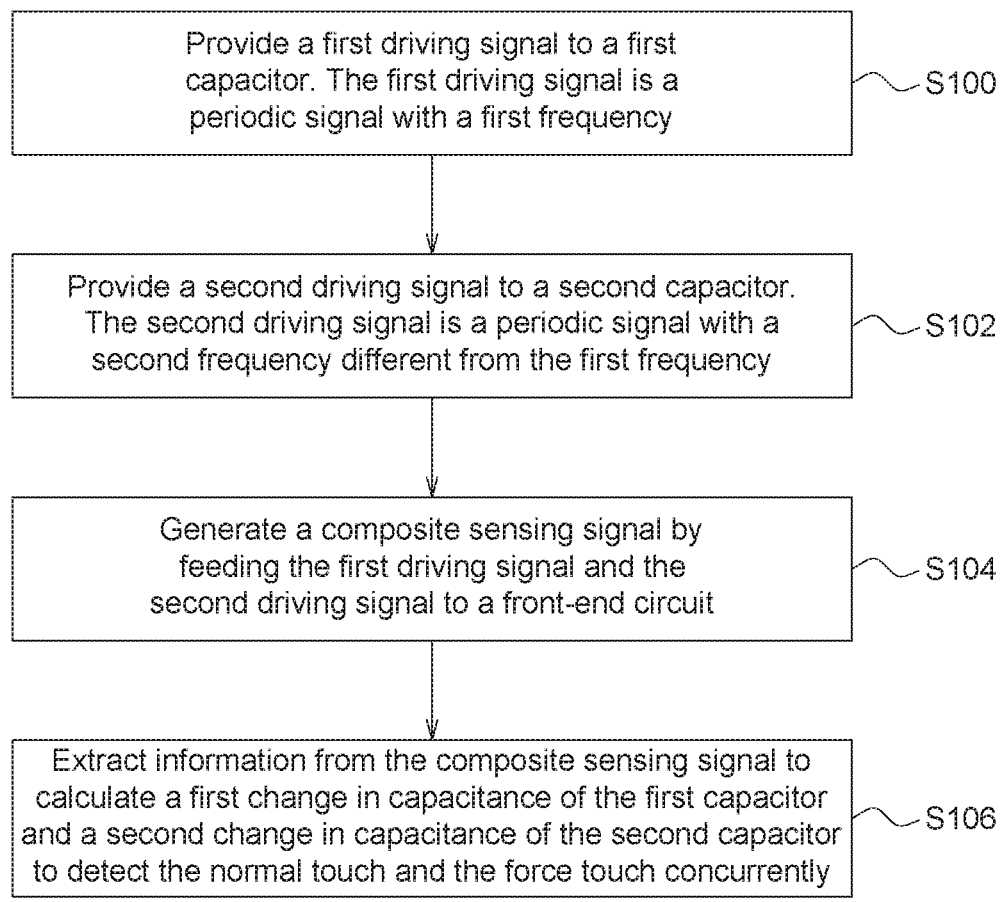
FIG. 1 shows a flowchart of the method for hybrid touch sensing according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In this disclosure, two capacitors (including the first capacitor and the second capacitor) are used for hybrid touch sensing. The first capacitor (hereafter referred to as $C_m$) may represent one or more capacitors in a mutual capacitance touch sensing device, and the second capacitor (hereafter referred to as $C_s$) may represent one or more capacitors in a self-capacitance touch sensing device. For the following embodiments, the first capacitor $C_m$ is used for force touch sensing, and the second capacitor $C_s$ is used for normal touch sensing for ease of understanding. However, the invention is not limited thereto. For example, in an alternative embodiment, mutual capacitance may be used for normal touch sensing, and self-capacitance may be used for force touch sensing. Also the first capacitor may be corresponding to self-capacitance and the second capacitor may be corresponding to mutual capacitance in an alternative embodiment. The exact correspondence relationship is not restricted to any particular embodiment. A person with ordinary skill in the art can understand how to modify the embodiments provided below to change the correspondence relationship. For simplicity reasons, the disclosure below discusses the situation that the first capacitor (formed by mutual capacitance) is used for force touch sensing, and the second capacitor (formed by self-capacitance) is used for normal touch sensing.

FIG. 1 shows a flowchart of the method for hybrid touch sensing according to one embodiment of the invention. The method is used for detecting a normal touch and a force touch concurrently. The method includes the following steps. Step S100: Provide a first driving signal $V_1$ to a first capacitor $C_m$, wherein the first driving signal $V_1$ is a periodic signal with a first frequency $f_1$. Step S102: Provide a second driving signal $V_2$ to a second capacitor $C_s$, wherein the second driving signal $V_2$ is a periodic signal with a second frequency $f_2$ different from the first frequency $f_1$. Step S104: Generate a composite sensing signal $V_o$ by feeding the first driving signal $V_1$ and the second driving signal $V_2$ to a front-end circuit. Step S106: Extract information from the composite sensing signal $V_o$ to calculate a first change in capacitance of the first capacitor $C_m$ and a second change in capacitance of the second capacitor $C_s$ to detect the normal touch and the force touch concurrently. According to the method shown in FIG. 1, because the first driving signal $V_1$ and the second driving signal $V_2$ are fed to a common front-end circuit to generate a composite sensing signal $V_o$, the composite sensing signal $V_o$ encompasses information related to both normal touch and force touch. Because the first driving signal $V_1$ and the second driving signal $V_2$ have different frequencies, the composite sensing signal $V_o$ has two distinct frequency components. As such, the step S106 may be for example implemented by filtering the composite sensing signal $V_o$ or analyzing the spectrum of the composite sensing signal $V_o$ to extract useful information. After the first change in capacitance and the second change in capacitance are obtained, a position of the normal touch may be determined according to the second change in capacitance, and a magnitude of the force touch may be determined according to the first change in capacitance.

Since normal touch sensing and force touch sensing are integrated in one signal, there is no need for processing these two kinds of touch sensing in a time division manner. In other words, normal touch and force touch can be detected concurrently.

Figure 2:
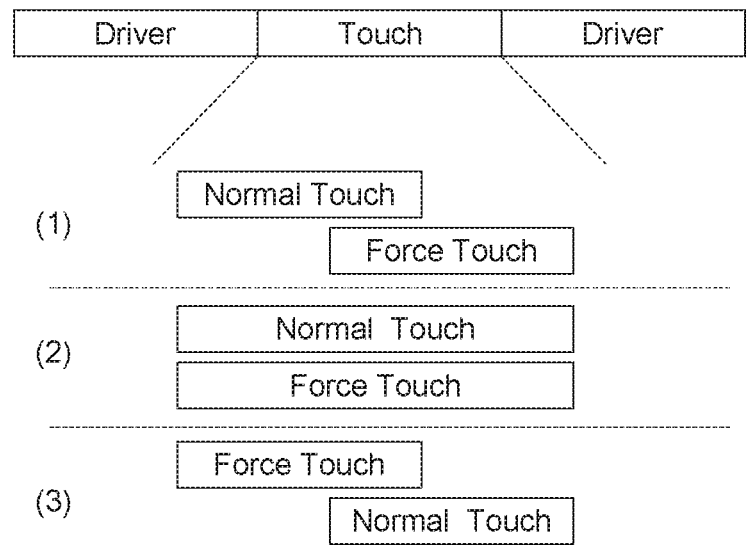
FIG. 2 shows a timing diagram illustrating an example of detecting normal touch and force touch concurrently.

FIG. 2 shows a timing diagram illustrating an example of detecting normal touch and force touch concurrently. The control timing sequence for a touch sensing device may be divided into driver time slots and touch time slots. The normal touch sensing and the force touch sensing may occupy the entire or a part of the touch time slot. There may be several possible scenarios for the concurrent detection. As scenarios (1)-(3) shown in FIG. 2, the time period for normal touch sensing and the time period for force touch sensing may have different degrees of overlapping and may have different orders. Such overlapping in time reduces the detection time.

Figure 3:
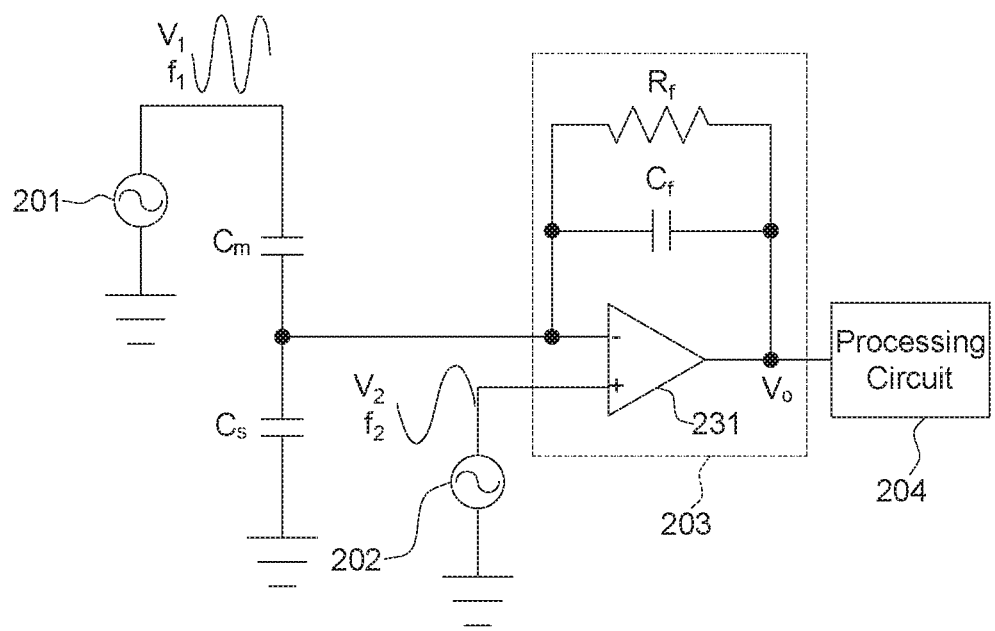
FIG. 3 shows a device for hybrid touch sensing according to one embodiment of the invention.

There are various circuit implementations regarding the method shown in FIG. 1. FIG. 3 shows a device for hybrid touch sensing according to one embodiment of the invention. The device 2 includes a first capacitor $C_m$, a second capacitor $C_s$, a first driving source 201, a second driving source 202, a front-end circuit 203, and a processing circuit 204. The first driving source 201 provides a first driving signal $V_1$ to the first capacitor $C_m$, wherein the first driving signal $V_1$ is a periodic signal with a first frequency $f_1$. The second driving source 202 provides a second driving signal $V_2$ to the second capacitor $C_s$, wherein the second driving signal $V_2$ is a periodic signal with a second frequency $f_2$ different from the first frequency $f_1$. The front-end circuit 203 is configured to generate a composite sensing signal $V_o$ in response to the first driving signal $V_1$ and the second driving signal $V_2$. The processing circuit 204 is configured to extract information from the composite sensing signal $V_o$ to calculate a first change in capacitance of the first capacitor $C_m$ and a second change in capacitance of the second capacitor $C_s$ to detect the normal touch and the force touch concurrently.

According to the circuit structure shown in FIG. 3, the first capacitor $C_m$, and the second capacitor $C_s$ are connected to each other, and thus only one hardware pin is required for detecting both the normal touch and the force touch. The method and device for hybrid touch sensing disclosed herein can therefore reduce the number of pins required, save the hardware cost, and also reduce power consumption.

The processing circuit 204 may be implemented by several different types of hardware circuits. In one embodiment, the processing circuit 204 may be a general purpose processor capable of performing versatile tasks, including arithmetic operations and spectral analysis. In another embodiment, the processing circuit 204 may be a hardware filter to selectively pass the signals with specific frequency bands. In still another embodiment, the processing circuit 204 may be a hardware demodulator to demodulate the composite sensing signal $V_o$ to separate a first component signal having the first frequency $f_1$ and a second component signal having the second frequency $f_2$. Depending on the separated frequency components, the processing circuit 204 may calculate the capacitance value, that is, the first change in capacitance of the first capacitor $C_m$ and the second change in capacitance of the second capacitor $C_s$. After that, the processing circuit 204 may determine a position of the normal touch according to the second change in capacitance, and determine a magnitude of the force touch according to the first change in capacitance.

The front-end circuit 203 may include an operational amplifier 231 and a feedback path. The operational amplifier 231 has a first input terminal (for example, an inverting input terminal), a second input terminal (for example, a non-inverting input terminal), and an output terminal. The first input terminal is coupled to the first driving signal $V_1$ through the first capacitor $C_m$, the second input terminal is coupled to the second driving signal $V_2$, and the composite sensing signal $V_o$ is generated at the output terminal. The feedback path is coupled between the first input terminal and the output terminal of the operational amplifier 231. The feedback path constitutes a negative feedback loop. There is virtual short between the first and second input terminals of the operation amplifier 231. The second driving voltage $V_2$ is effectively provided to the second capacitor $C_s$.

FIG. 3 shows an example of continuous time implementation. The first driving source 201 generates a pure sinusoidal signal $V_1$ with single frequency component $f_1$. Similarly, the second driving source 202 generates a pure sinusoidal signal $V_2$ with single frequency component $f_2$. The feedback path includes a feedback resistor $R_f$ and a feedback capacitor $C_f$. The transfer function of the front-end circuit 203 in FIG. 3 may be represented as:

$$V_o = \left(\frac{sR_f C_m}{1+sR_f C_f}\right)V_1 + \left(1 + \frac{s^2 R_f(C_m+C_s)}{1+sR_f C_f}\right)V_2 \qquad \text{eq. (1)}$$

Figure 4:
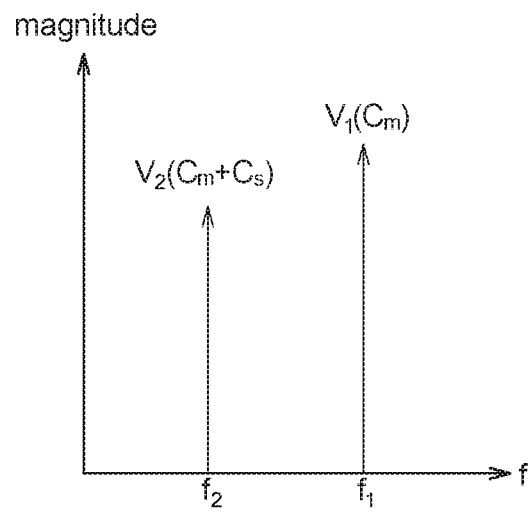
FIG. 4 shows an example spectrum of the composite sensing signal according to one embodiment of the invention.

FIG. 4 shows an example spectrum of the composite sensing signal according to one embodiment of the invention. Because the first and second driving signals $V_1$ and $V_2$ are pure sinusoidal with different frequencies, the spectrum of the composite sensing signal $V_o$ shows two clear frequency bins. The composite sensing signal $V_o$ may be demodulated to separate a first component signal having the first frequency $f_1$ (the right bin shown in FIG. 4) and a second component signal having the second frequency $f_2$ (the left bin shown in FIG. 4). According to the transfer function eq. (1) of the front-end circuit 203, it can be seen that the first component signal is independent of the second change in capacitance of the second capacitor $C_s$. As such, the processing circuit 204 may calculate the first change in capacitance of the first capacitor $C_m$ according to the first component signal. After obtaining the first change in capacitance, the processing circuit 204 then calculates the second change in capacitance of the second capacitor $C_s$ according to the second component signal and the first change in capacitance of the first capacitor $C_m$.

Figure 5A:
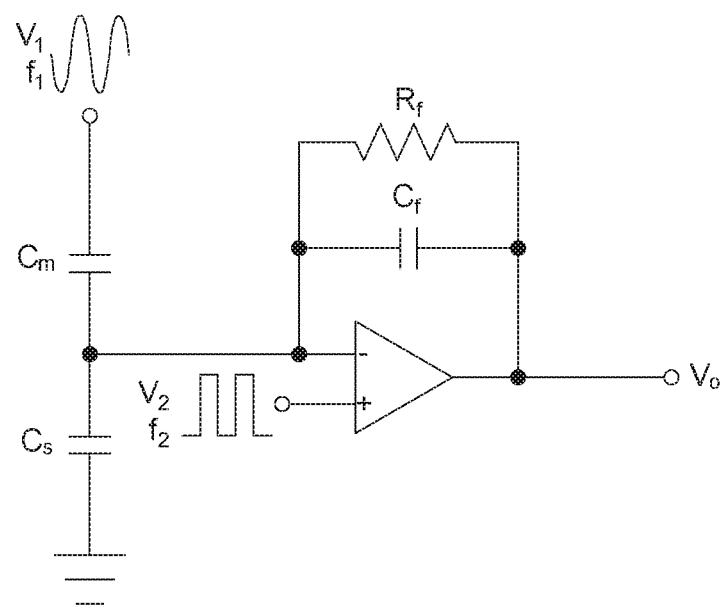
FIG. 5A shows a device for hybrid touch sensing according to one embodiment of the invention.
Figure 5B:
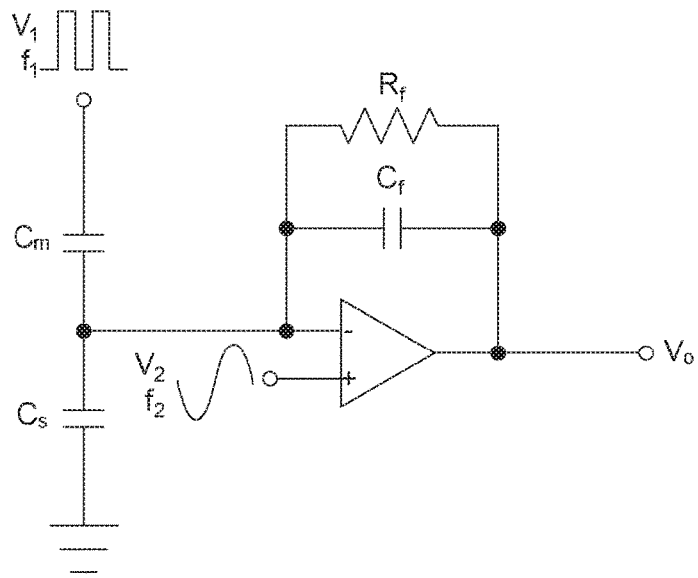
FIG. 5B shows a device for hybrid touch sensing according to one embodiment of the invention.

The circuit shown in FIG. 3 utilizes two sinusoidal signals as driving sources to make the demodulation process easier. However, the driving sources are not limited to only pure sinusoidal signals. FIG. 5A and FIG. 5B show other examples of continuous time implementations for hybrid touch sensing according to embodiments of the invention. In FIG. 5A and FIG. 5B only the first capacitor $C_m$, the second capacitor $C_s$, and the operation amplifier 231 are shown, the driving sources and the processing circuit are omitted for ease of illustration. In FIG. 5A, the second driving signal $V_2$ is a periodic square wave with the second frequency $f_2$. Because the square wave contains components of odd-integer harmonic frequencies, such as $3f_2$, $5f_2$, $7f_2$, and so on, the spectrum of the composite sensing signal $V_o$ shows several frequency bins, including those odd-integer harmonics. In order to successfully distinguish between the first component signal and the second component signal in the frequency domain, the first frequency $f_1$ is deliberately selected not to be a multiple of the second frequency $f_2$ ($f_1 \neq N*f_2$, N is a positive integer). As such, the first frequency $f_1$ on the spectrum may be identified first, and the first change in capacitance of the first capacitor $C_m$ may be obtained according to the transfer function eq. (1). After that, based on several frequency components, the second frequency $f_2$ may be identified according to the multiplication relationship between these frequency bins, and then the second change in capacitance of the second capacitor $C_s$ may be obtained. In FIG. 5B, the first driving signal $V_1$ is a periodic square wave with the first frequency $f_1$. The second frequency $f_2$ is set to be not a multiple of the first frequency $f_1$ ($f_2 \neq N*f_1$, N is a positive integer). The calculation flow may be performed in a similar manner and thus is not repeated here.

In the above embodiments, as the transfer function eq. (1) shows, the first component signal (with the first frequency $f_1$) is only affected by the first capacitor $C_m$. That is, the second change in capacitance of the second capacitor $C_s$ does not affect the first component signal. It is noted that the first component signal is an important reference value in the calculation flow. Therefore, a frequency that produces the least amount of noise may be chosen as the first frequency $f_1$ such that the first component signal may be as stable as possible (to make the spectrum as clean as possible). The selection of the first frequency $f_1$ may be performed by scanning through several possible frequency candidates, and checking the signal-to-noise ratio induced by each frequency candidate. Such frequency scanning and checking may be performed off-line (such as before the touching device is shipped to users) and/or on-line (scanning when the touching device is being operated). In addition, a frequency that produces the second-to-least amount of noise may be chosen as the second frequency $f_2$.

Figure 6:
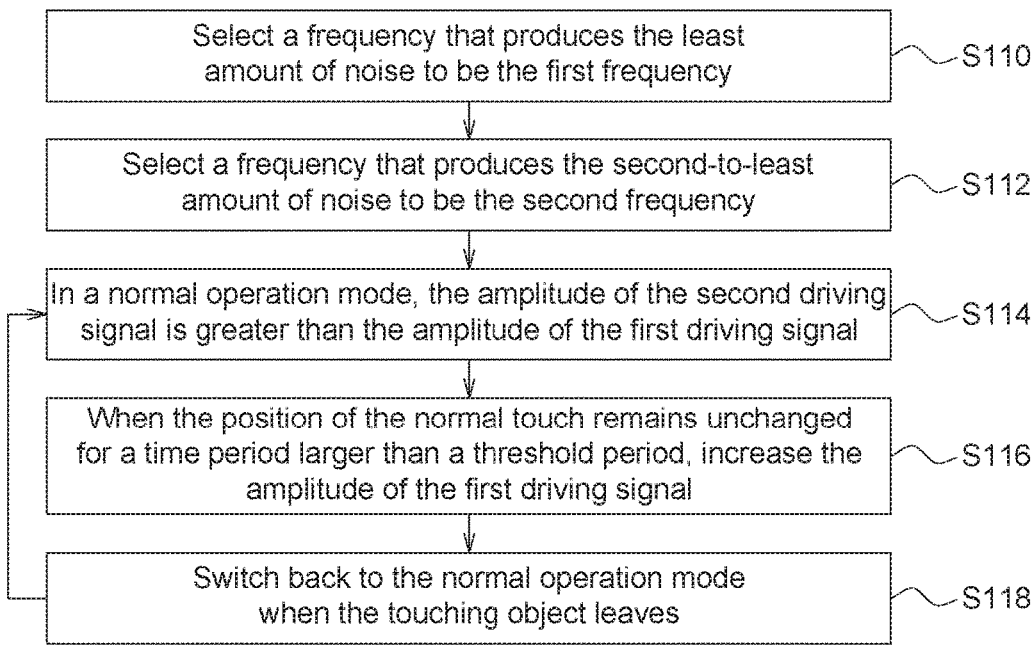
FIG. 6 shows a flowchart of the method for hybrid touch sensing of a continuous-time scheme according to one embodiment of the invention.

FIG. 6 shows a flowchart of the method for hybrid touch sensing of a continuous-time scheme according to one embodiment of the invention. The method shown in FIG. 6 further includes the following steps. Step S110: Select a frequency that produces the least amount of noise to be the first frequency. Step S112: Select a frequency that produces the second-to-least amount of noise to be the second frequency. Step S114: In a normal operation mode, the amplitude of the second driving signal is greater than the amplitude of the first driving signal. Step S116: When the position of the normal touch remains unchanged for a time period larger than a threshold period, increase the amplitude of the first driving signal. Step S118: Switch back to the normal operation mode when the touching object leaves.

The steps S110 and S112 may be optionally performed. These two steps may be included to have a more stable output signal to make the demodulation process easier. Note that in the steps of selecting the first frequency $f_1$ and the second frequency $f_2$, avoid selecting a multiple of the first frequency $f_1$ to be the second frequency $f_2$ if the first driving signal $V_1$ is a periodic square wave, and vice versa.

In the steps S114-S118, the operation modes are divided into a normal operation mode and a force operation node. In the normal operation mode, it is important to capture the position or the movement of the touching object (such as user's finger or stylus). As such, the amplitude of the second driving signal $V_2$ may be set to be greater than the amplitude of the first driving signal $V_1$, such that the frequency component $f_2$ (corresponding to sensing of the normal touch) can be identified more clearly.

The processing circuit 204 may determine that the operation mode is switched to the force operation mode when the position of the normal touch remains unchanged for a time period larger than a threshold period. The threshold period may be a suitable time length (for example, 2 seconds) preset by the processing circuit 204. In the force operation mode, the user's finger may stay in the same position, and the required sensitivity for pressure detection increases. Therefore the first driving source 201 may increase the amplitude of the first driving signal $V_1$ in the force operation mode for a better force sensing capability. The increased amplitude of the first driving signal $V_1$ may be greater than or less than the amplitude of the second driving signal $V_2$, which is not limited herein. The time period that the touch position remains unchanged may be calculated by a timer or a counter circuit, which may be disposed in the processing circuit 204. When the touching object leaves the touch panel, or when the touching object starts moving again, the processing circuit 204 may determine to switch back to the normal operation mode (step S118 goes back to step S114). The amplitude of the first driving signal $V_1$ may be recovered to the original voltage level in the normal operation mode.

Figure 7:
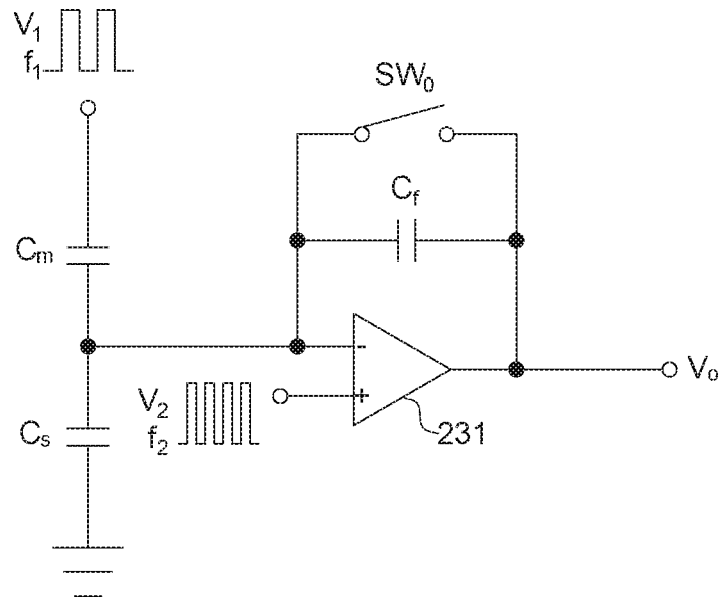
FIG. 7 shows a device for hybrid touch sensing according to one embodiment of the invention.

FIG. 7 shows a device for hybrid touch sensing according to one embodiment of the invention. As compared to the device 2 shown in FIG. 3, the device 3 in FIG. 7 illustrates discrete time implementation. The front-end circuit 203 includes an operational amplifier 231 and a feedback path. The feedback path in this embodiment includes a switch $SW_0$ operated at a sampling frequency $f_s$. The first driving signal $V_1$ is a periodic square wave with first frequency $f_1$, and the second driving signal $V_2$ is a periodic square wave with second frequency $f_2$. In one embodiment, the sampling frequency $f_s$ is set to be greater than or equal to twice the greater of the first frequency $f_1$ and the second frequency $f_2$ ($f_s \geq 2f_1$, $f_s \geq 2f_2$).

Figure 8:
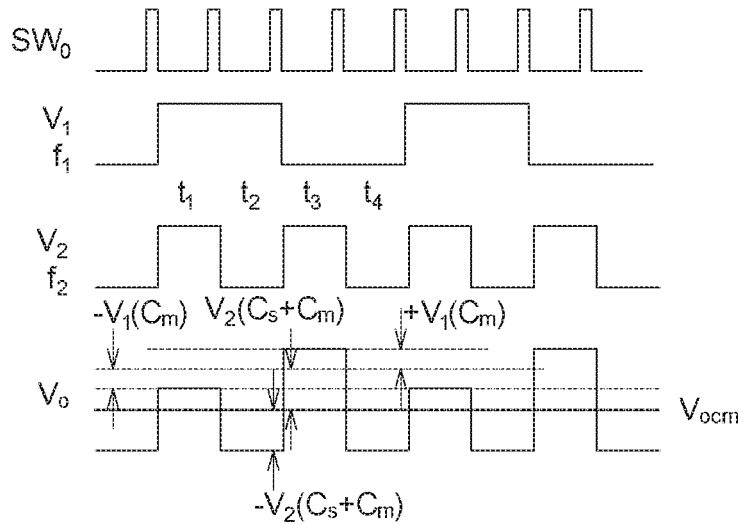
FIG. 8 shows an example signal waveform of the composite sensing signal according to one embodiment of the invention.

FIG. 8 shows an example signal waveform of the composite sensing signal according to one embodiment of the invention. In this example, the second frequency $f_2$ is twice as fast as the first frequency $f_1$, and the sampling frequency $f_s$ is set to be equal to twice the second frequency $f_2$. Multiple sampling voltages of the composite sensing signal $V_o$ at different time instants may be obtained as follows (the common mode voltage of the composite sensing signal $V_{ocm}$ is omitted for simplicity reason):

$$V_o(t_1) = V_2(C_s + C_m) - V_1(C_m) \qquad \text{eq. (2)}$$

$$V_o(t_2) = -V_2(C_s + C_m) \qquad \text{eq. (3)}$$

$$V_o(t_3) = V_2(C_s + C_m) + V_1(C_m) \qquad \text{eq. (4)}$$

$$V_o(t_4) = -V_2(C_s + C_m) \qquad \text{eq. (5)}$$

Similar to the embodiment shown in FIG. 3, the first driving signal relates to only the first capacitor $C_m$ because of the circuit structure. Thus, the first change in capacitance of the first capacitor $C_m$ may be obtained from the above equations. For example, subtracting eq. (2) from eq. (4) yields $V_o(t_3) - V_o(t_1) = 2 \times V_1(C_m)$. After obtaining the first change in capacitance of the first capacitor $C_m$, the second change in capacitance of the second capacitor $C_s$ may also be calculated according to the above equations (2)-(5).

In the embodiment shown in FIG. 8, the second frequency $f_2$ is two times of the first frequency $f_1$, and the first driving signal $V_1$ and the second driving signal $V_2$ are synchronized in phase. However, the phase and frequency relations are not limited thereto. For example, in one embodiment the phase delay between the first driving signal $V_1$ and the second driving signal $V_2$ may be half cycle of $V_2$, and in one embodiment the first frequency $f_1$ may be four times of the second frequency $f_2$. By adopting the device 3 shown in FIG. 7, the first change in capacitance of the first capacitor $C_m$ and the second change in capacitance of the second capacitor $C_s$ may be obtained from the composite sensing signal $V_o$.

Figure 9:
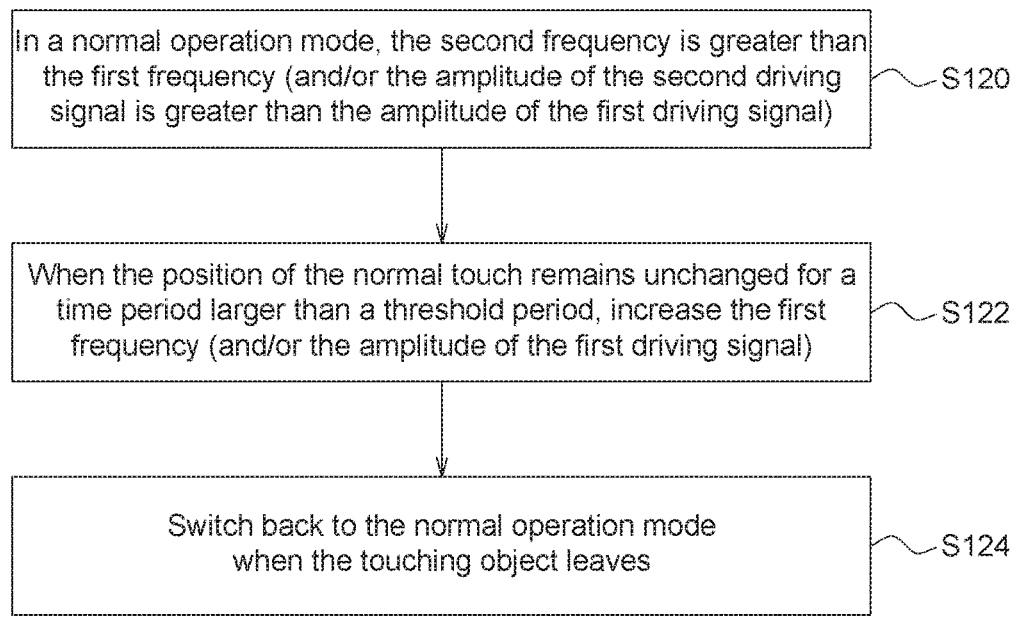
FIG. 9 shows a flowchart of the method for hybrid touch sensing of a discrete-time scheme according to one embodiment of the invention.

FIG. 9 shows a flowchart of the method for hybrid touch sensing of a discrete-time scheme according to one embodiment of the invention. Similar to the flowchart shown in FIG. 6, the operation modes may also be divided into a normal operation mode and a force operation mode in the discrete-time scheme. In the normal operation mode, it is important to capture the position or the movement of the touching object. To achieve a better resolution for capturing the second change in capacitance of the second capacitor $C_s$, the second frequency $f_2$ may be set to be greater than the first frequency $f_1$ (step S120). Increasing the second frequency $f_2$, thus increasing the sampling frequency $f_s$ as well, increases the number of sampling points to be analyzed in the processing circuit 204, resulting in a more accurate analysis result.

In the step S120, the amplitude of the second driving signal $V_2$ may also be set to be greater than the amplitude of the first driving signal $V_1$ in addition to (or instead of) the frequency setup ($f_2 > f_1$) as mentioned above. Increasing the amplitude of the second driving signal $V_2$ also helps to achieve a better normal touch sensing accuracy.

The operation mode may be switched to the force operation mode when the position of the normal touch remains unchanged for a time period larger than a threshold period. In the force operation mode, the first frequency $f_1$ (and/or the amplitude of the first driving signal $V_1$) may be increased for a better force sensing capability (step S122). When the touching object leaves the touch panel, or when the touching object starts moving again, switch back to the normal operation mode (step S124).

Figure 10:
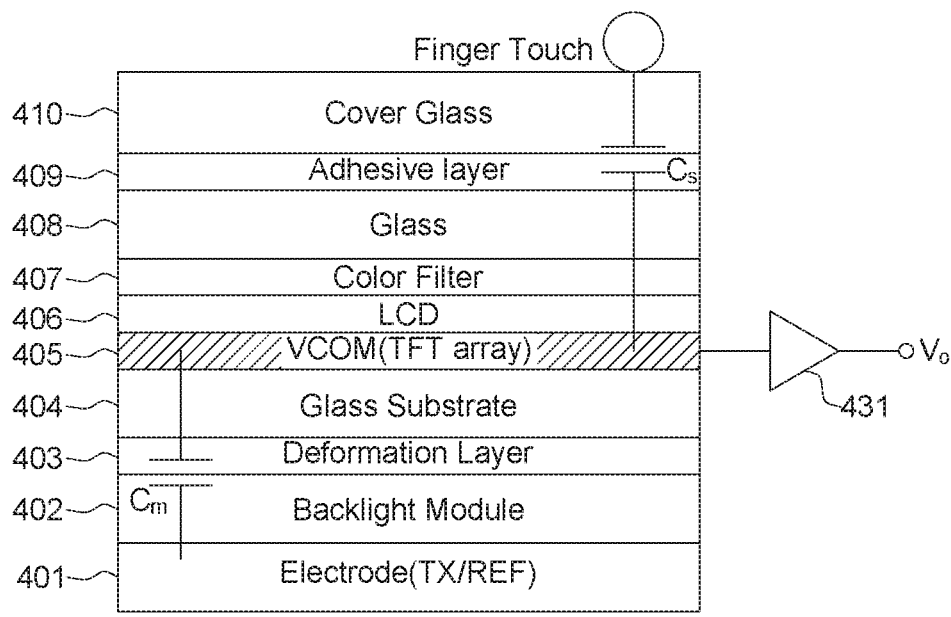
FIG. 10 shows an example implementation of the device for hybrid touch sensing in a TFT LCD panel according to one embodiment of the invention.

FIG. 10 shows an example implementation of the device for hybrid touch sensing in a thin-film transistor (TFT) liquid crystal display (LCD) panel according to one embodiment of the invention. An in-cell implementation of the touch device is shown in this embodiment. The VCOM layer (TFT array) 405 is used for touch sensing. The operational amplifier 431 shown in FIG. 10 may be corresponding to the operational amplifier 231 shown in FIG. 3. A deformation layer 403 is disposed between the backlight module 402 and the glass substrate 404. The thickness of the deformation layer 403 may be altered in response to the pressure applied thereto, resulting a change in mutual capacitance of the capacitor $C_m$ (formed between the electrode 401 and the VCOM layer 405). The electrode 401 is for example a backlight metal shield. The capacitor $C_m$ may be used for force touch sensing in this embodiment. The deformation layer 403 may be implemented by an air-gap layer or a cushion to provide flexible thickness and variable capacitance. In one embodiment, the deformation layer 403 may be disposed between the backlight module 402 and the electrode 401. The electrode 401 may be used as the first driving source (TX) to provide the first driving signal $V_1$. As for the normal touch sensing, the detection may rely on a change in self-capacitance of the capacitor Cs (formed between a finger and the VCOM layer 405). The normal touch and the force touch may be concurrently detected by the composite sensing signal $V_o$ generated at the output terminal of the operational amplifier 431.

Figure 11:
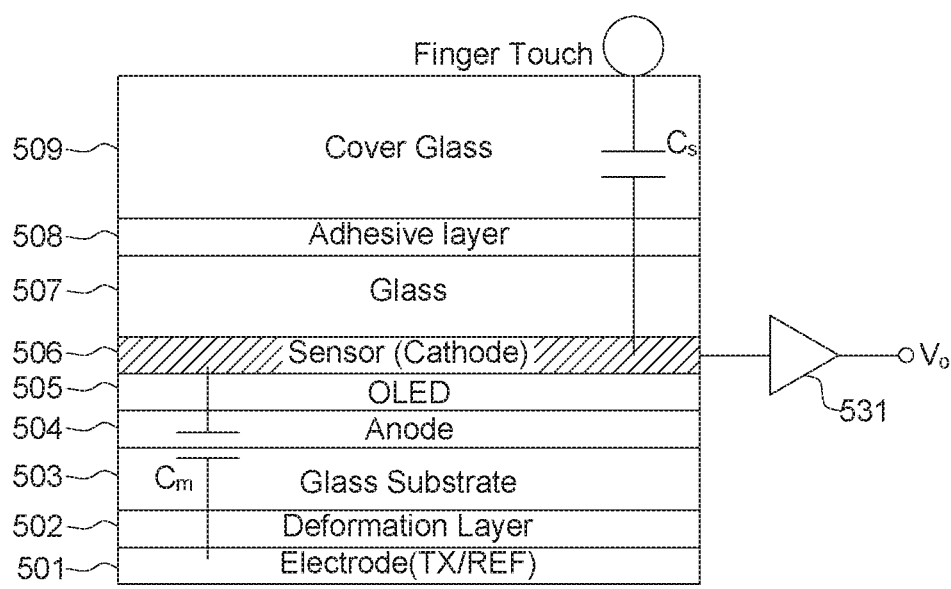
FIG. 11 shows an example implementation of the device for hybrid touch sensing in an AMOLED panel according to one embodiment of the invention.

FIG. 11 shows an example implementation of the device for hybrid touch sensing in an active-matrix organic light-emitting diode (AMOLED) panel according to one embodiment of the invention. The cathode layer 506 is used for touch sensing. The operational amplifier 531 shown in FIG. 10 may be corresponding to the operational amplifier 231 shown in FIG. 3. The thickness of the deformation layer 502 may be altered in response to the pressure applied thereto, resulting a change in mutual capacitance of the capacitor $C_m$ (formed between the electrode 501 and the cathode layer 506). The capacitor $C_m$ may be used for force touch sensing in this embodiment. The electrode 501 may be used as the first driving source (TX) to provide the first driving signal $V_1$. As for the normal touch sensing, the detection may rely on a change in self-capacitance of the capacitor Cs (formed between a finger and the cathode layer 506). The normal touch and the force touch may be concurrently detected by the composite sensing signal $V_o$ generated at the output terminal of the operational amplifier 531.

As described above, the method and device for hybrid touch sensing disclosed herein may be applied to several types of touch panels, including TFT LCD panel and OLED panel. By adopting the disclosed method, the normal touch sensing signal and the force touch sensing signal are fed to a common hardware circuit to generate a composite touch sensing signal. Thus the normal touch and the force touch can be detected concurrently accordingly. In addition, the frequency and amplitude of the driving signals for the normal touch and force touch may be adjusted appropriately to enhance the touch sensing capability, such as improving the sensing accuracy. A continuous time scheme and a discrete time scheme are provided to show various possible circuit implementations. Useful information related to touch sensing may be extracted from the composite sensing signal by demodulating or voltage sampling. The hardware cost as well as power consumption can be reduced because the composited sensing signal reduces the number of pins required by the processing circuit.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for hybrid touch sensing, for detecting a normal touch and a force touch concurrently, the method comprising steps of:
   providing a first driving signal to a first capacitor, wherein the first driving signal is a periodic signal with a first frequency, capacitance of the first capacitor changes in response to a first touch, the first touch is one of the normal touch and the force touch;
   providing a second driving signal to a second capacitor, wherein the second driving signal is a periodic signal with a second frequency different from the first frequency, capacitance of the second capacitor changes in response to a second touch, the second touch is the other one of the normal touch and the force touch;
   generating a composite sensing signal by feeding the first driving signal and the second driving signal to a front-end circuit; and
   extracting information from the composite sensing signal to calculate a first change in capacitance of the first capacitor and a second change in capacitance of the second capacitor to detect the normal touch and the force touch concurrently.

2. The method according to claim 1, wherein the step of extracting information from the composite sensing signal comprises:
   demodulating the composite sensing signal to separate a first component signal having the first frequency and a second component signal having the second frequency;
   calculating the first change in capacitance according to the first component signal; and
   calculating the second change in capacitance according to the second component signal and the first change in capacitance;
   wherein the first component signal is independent of the second change in capacitance.

3. The method according to claim 1, wherein the step of extracting information from the composite sensing signal comprises:
   sampling the composite sensing signal with a sampling frequency to obtain a plurality of sampling voltages; and
   calculating the first change in capacitance and the second change in capacitance according to the plurality of sampling voltages;
   wherein the sampling frequency is greater than or equal to twice the greater of the first frequency and the second frequency.

4. The method according to claim 1, wherein the front-end circuit comprises:
   an operational amplifier having a first input terminal, a second input terminal, and an output terminal, wherein the first input terminal is coupled to the first driving signal through the first capacitor, the second input terminal is coupled to the second driving signal, and the composite sensing signal is generated at the output terminal; and
   a feedback path coupled between the first input terminal and the output terminal of the operational amplifier.

5. The method according to claim 4, wherein the feedback path comprises a switch operated at a sampling frequency greater than or equal to twice the greater of the first frequency and the second frequency.

6. The method according to claim 1, wherein the first capacitor is used for force touch sensing, the second capacitor is used for normal touch sensing, and an amplitude of the second driving signal is greater than an amplitude of the first driving signal in a normal operation mode.

7. The method according to claim 6, further comprising:
   switching to a force operation mode when a position of the normal touch remains unchanged for a time period larger than a threshold period, and increasing the amplitude of the first driving signal in the force operation mode.

8. The method according to claim 1, wherein the first capacitor is used for force touch sensing, the second capacitor is used for normal touch sensing, and the second frequency is greater than the first frequency in a normal operation mode.

9. The method according to claim 8, further comprising:
   switching to a force operation mode when a position of the normal touch remains unchanged for a time period larger than a threshold period, and increasing the first frequency in the force operation mode.

10. The method according to claim 1, further comprising:
    selecting a frequency that produces the least amount of noise to be the first frequency; and
    selecting a frequency that produces the second-to-least amount of noise to be the second frequency.

11. A device for hybrid touch sensing, for detecting a normal touch and a force touch concurrently, the device comprising:
    a first capacitor, wherein capacitance of the first capacitor changes in response to a first touch, the first touch is one of the normal touch and the force touch;
    a second capacitor, wherein capacitance of the second capacitor changes in response to a second touch, the second touch is the other one of the normal touch and the force touch;
    a first driving source, providing a first driving signal to the first capacitor, wherein the first driving signal is a periodic signal with a first frequency;
    a second driving source, providing a second driving signal to the second capacitor, wherein the second driving signal is a periodic signal with a second frequency different from the first frequency;
    a front-end circuit, configured to generate a composite sensing signal in response to the first driving signal and the second driving signal; and a processing circuit, configured to extract information from the composite sensing signal to calculate a first change in capacitance of the first capacitor and a second change in capacitance of the second capacitor to detect the normal touch and the force touch concurrently.

12. The device according to claim 11, wherein the processing circuit is configured to demodulate the composite sensing signal to separate a first component signal having the first frequency and a second component signal having the second frequency, calculate the first change in capacitance according to the first component signal, and calculate the second change in capacitance according to the second component signal and the first change in capacitance;

wherein the first component signal is independent of the second change in capacitance.

13. The device according to claim 11, wherein the processing circuit is configured to sample the composite sensing signal with a sampling frequency to obtain a plurality of sampling voltages, and calculate the first change in capacitance and the second change in capacitance according to the plurality of sampling voltages;

wherein the sampling frequency is greater than or equal to twice the greater of the first frequency and the second frequency.

14. The device according to claim 11, wherein the front-end circuit comprises:

an operational amplifier having a first input terminal, a second input terminal, and an output terminal, wherein the first input terminal is coupled to the first driving signal through the first capacitor, the second input terminal is coupled to the second driving signal, and the composite sensing signal is generated at the output terminal; and a feedback path coupled between the first input terminal and the output terminal of the operational amplifier.

15. The device according to claim 14, wherein the feedback path comprises a switch operated at a sampling frequency greater than or equal to twice the greater of the first frequency and the second frequency.

16. The device according to claim 11, wherein the first capacitor is used for force touch sensing, the second capacitor is used for normal touch sensing, and an amplitude of the second driving signal is greater than an amplitude of the first driving signal in a normal operation mode.

17. The device according to claim 16, wherein the processing circuit determines to switch to a force operation mode when the processing circuit detects that a position of the normal touch remains unchanged for a time period larger than a threshold period, and the first driving source increases the amplitude of the first driving signal in the force operation mode.

18. The device according to claim 11, wherein the first capacitor is used for force touch sensing, the second capacitor is used for normal touch sensing, and the second frequency is greater than the first frequency in a normal operation mode.

19. The device according to claim 18, wherein the processing circuit determines to switch to a force operation mode when the processing circuit detects that a position of the normal touch remains unchanged for a time period larger than a threshold period, and the first driving source increases the first frequency in the force operation mode.

20. The device according to claim 11, wherein the first frequency is a frequency that produces the least amount of noise, and the second frequency is a frequency that produces the second-to-least amount of noise.

* * * * *